US012785579B2

(12) United States Patent
Do et al.

(10) Patent No.: US 12,785,579 B2
(45) Date of Patent: Nov. 3, 2026

(54) POWER MODULE FOR VEHICLE INCLUDING A BIFURCATED POWER LEAD

(71) Applicants: Hyundai Motor Company, Seoul (KR); Kia Corporation, Seoul (KR)

(72) Inventors: Han Jin Do, Incheon (KR); Jin Myeong Yang, Seongnam-Si (KR); Jae Eun Cha, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 607 days.

(21) Appl. No.: 18/144,681

(22) Filed: May 8, 2023

(65) Prior Publication Data

US 2024/0106336 A1 Mar. 28, 2024

(30) Foreign Application Priority Data

Sep. 26, 2022 (KR) ........................ 10-2022-0121622

(51) Int. Cl.
*H02M 7/00* (2006.01)

(52) U.S. Cl.
CPC .................................. *H02M 7/003* (2013.01)

(58) Field of Classification Search
CPC ................. H02M 7/003; H01L 23/498; H01L 2224/32225; H10L 23/49844
See application file for complete search history.

(56) References Cited

U.S. PATENT DOCUMENTS

| | | | | |
|---|---|---|---|---|
| 9,041,183 | B2 | 5/2015 | Liang et al. | |
| 2013/0020694 | A1* | 1/2013 | Liang | H01L 23/473 257/691 |
| 2017/0085190 | A1* | 3/2017 | Nakajima | H02M 7/003 |
| 2018/0122720 | A1* | 5/2018 | Hable | H01L 23/3121 |
| 2020/0395266 | A1 | 12/2020 | Hoegerl et al. | |
| 2022/0359434 | A1* | 11/2022 | Kusukawa | H01L 25/16 |

FOREIGN PATENT DOCUMENTS

| | | | | |
|---|---|---|---|---|
| JP | 3826667 | | 9/2006 | |
| JP | 4385324 | | 12/2009 | |
| JP | 2015-002187 | | 1/2015 | |
| JP | 2015002187 | A * | 1/2015 | H01L 24/33 |
| JP | 7105214 | B2 * | 7/2022 | H01L 23/60 |
| KR | 10-2017-0071142 | | 6/2017 | |
| KR | 10-2018-0038597 | | 4/2018 | |
| KR | 10-1905995 | | 10/2018 | |

* cited by examiner

*Primary Examiner* — Davienne N Monbleau
*Assistant Examiner* — Emily Farmer
(74) *Attorney, Agent, or Firm* — MORGAN, LEWIS & BOCKIUS LLP

(57) ABSTRACT

A power module for a vehicle, includes: a lower substrate and an upper substrate spaced from the lower substrate; a semiconductor chip disposed between the lower substrate and the upper substrate; a first power lead disposed being spaced from the semiconductor chip and connected to one of the lower substrate and the upper substrate; and a second power lead disposed being spaced from the semiconductor chip and connected to both the lower substrate and the upper substrate.

10 Claims, 5 Drawing Sheets

POWER MODULE FOR VEHICLE INCLUDING A BIFURCATED POWER LEAD

CROSS REFERENCE TO RELATED APPLICATION

The present application claims priority to Korean Patent Application No. 10-2022-0121622, filed on Sep. 26, 2022, the entire contents of which is incorporated herein for all purposes by this reference.

BACKGROUND OF THE PRESENT DISCLOSURE

Field of the Present Disclosure

The present disclosure relates to a power module for a vehicle, and more to a power module for a vehicle, which is mounted to an inverter for operating a driving motor provided in an electric vehicle.

Description of Related Art

As one of the key components of hybrid electric vehicles and electric vehicles, there is a power converter (for example, an inverter). The power converter is a major part of an eco-friendly vehicle, and many technologies for the power converter have been developed. The key technology in the field of eco-friendly vehicles is to develop a power module which is a core part of the power converter and accounts for the highest costs.

A double-sided cooling power module requires an electrical connection between an upper substrate and a lower substrate for circuit configuration. In the instant case, a via spacer is used to electrically connect the upper substrate and the lower substrate. Furthermore, the via spacer is generally employed in the power module for the main purpose of electrical conduction rather than heat dissipation. The circuit configuration of the power module and the arrangement of other parts are varied depending on the positions of the via spacer, and it is therefore important where to place the via spacer. In addition, the size of the via spacer needs to be large to conduct a high current according to the characteristics of the power module using high power, and therefore there is a limit to reduce the size of the via spacer.

Conventionally, a part called the via spacer has been applied for electrical or physical connection in a general double-sided cooling power module.

In general, the spacer undergoes a bonding process using a bonding material to maintain the electrical connection between the upper substrate and the lower substrate. The double-sided cooling power module generates a lot of heat during operation due to the structure of internal chips disposed inside the power module. Furthermore, when neighboring chips generate heat simultaneously during the operation of the power module, thermal overlap effects between the chips cause the power module to additionally increase in temperature. Therefore, a metal layer applied to a semiconductor chip is consumed while reacting with the bonding material due to the heat generated during the operation of the power module, decreasing the durability (or lifespan) or deteriorating electrical characteristics.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to minimize a power module and reduce costs by making an upper substrate and a lower substrate face each other, and connecting a lead frame to the upper substrate and the lower substrate without a conventional via spacer for connecting the upper substrate and the lower substrate.

According to an exemplary embodiment of the present disclosure, there is provided a power module for a vehicle, including: a lower substrate and an upper substrate spaced from the lower substrate; a semiconductor chip disposed between the lower substrate and the upper substrate; a first power lead disposed being spaced from the semiconductor chip and connected to one of the lower substrate and the upper substrate; and a second power lead disposed being spaced from the semiconductor chip and connected to another of the lower substrate and the upper substrate.

The first power lead and the second power lead may be disposed at opposite sides to each other with the semiconductor chip between the first power lead and the second power lead on a plane.

The first power lead may be a positive electrode and a negative electrode, and the second power lead may be an output electrode.

The positive electrode may be connected to one of the upper substrate and the lower substrate, and the negative electrode may be connected to the other one of the upper substrate and the lower substrate.

The positive electrode and the negative electrode may be disposed to face each other in a vertical direction.

A current may flow in order of the first power lead, the semiconductor chip, and the second power lead, or in order of the second power lead, the semiconductor chip, and the first power lead.

A high side current may flow in order of the first power lead, the semiconductor chip, and the second power lead.

A low side current may flow in order of the second power lead, the semiconductor chip, and the first power lead.

The second power lead may include a first surface connected to the upper substrate, and a second surface opposite to the first surface and connected to the lower substrate.

The second power lead may bifurcate at one side thereof and connect the lower substrate and the upper substrate at a time.

In the power module for a vehicle according to an exemplary embodiment of the present disclosure, the upper substrate and the lower substrate face each other, the first power lead is connected to one of the upper substrate and the lower substrate, the second power lead is connected to the upper substrate and the lower substrate, replacing a conventional via spacer provided for connecting the upper substrate and the lower substrate, including an effect on miniaturizing the power module for a vehicle, and simplifying a process and reducing costs without a bonding process for the conventional via spacer.

Furthermore, the first power lead and the second power lead are disposed to face each other, so that a current can flow via the semiconductor chip, shortening a current path and including an effect on reducing parasitic inductance.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
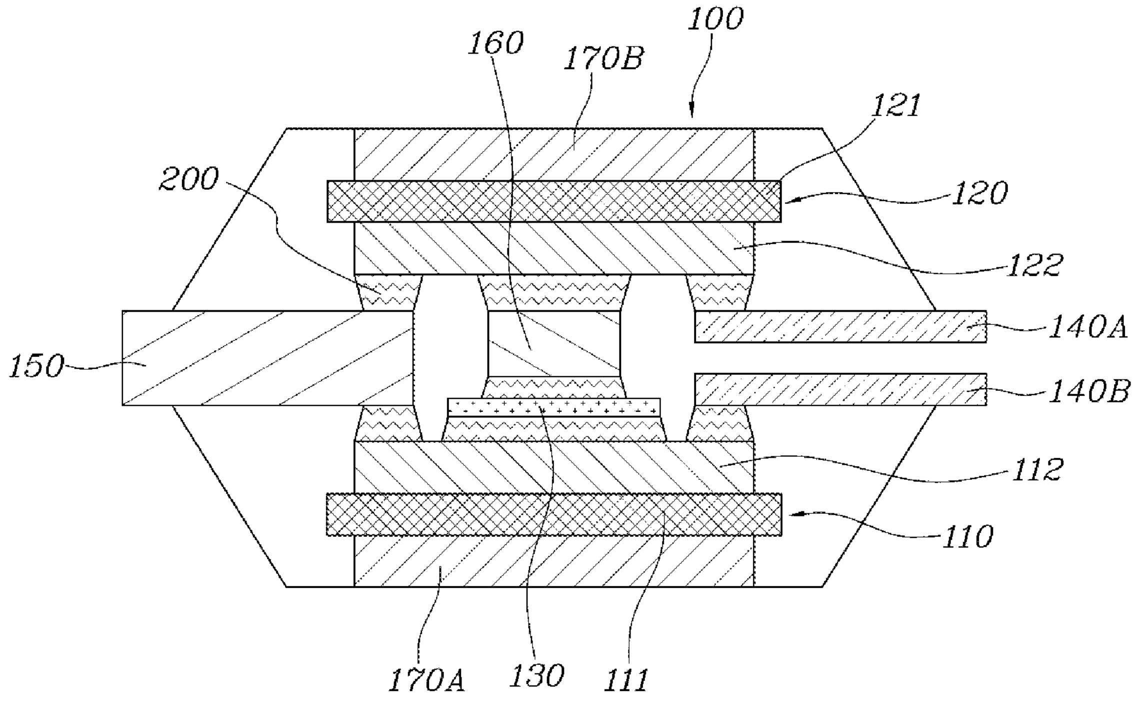
FIG. 1 is a lateral cross-sectional view of a power module for a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Regarding embodiments of the present disclosure included in the present specification or application, the specific structural or functional description is merely illustrative for describing the exemplary embodiments of the present disclosure, and embodiments of the present disclosure may be implemented in various forms but not be construed as being limited to the exemplary embodiments set forth in the present specification or application.

Because the exemplary embodiments of the present disclosure may be variously modified and have various forms, specific exemplary embodiments will be illustrated in the drawings and described in detail in the present specification or application. However, it should be understood that embodiments of the present disclosure are intended not to be limited to the specific embodiments but to cover all modifications, equivalents or alternatives without departing from the spirit and technical scope of the present disclosure.

Terms such as "first" and/or "second" are used herein merely to describe a variety of elements, but the elements are not limited by these terms. Such terms are used only for distinguishing one element from another element. For example, without departing from the conceptual scope of the present disclosure, a first element may be referred to as a second, and vice versa.

When a certain element is referred to as being "connected to" or "coupled to" another element, it will be understood that they may be directly connected to or coupled to each other but or intervening elements may be present therebetween. On the other hand, when a certain element is referred to as being "directly connected to" or "directly coupled to" another element, it will be understood that no intervening elements are present therebetween. Other expressions describing relationships between elements, such as "between," "immediately between," "adjacent to," "directly adjacent to," or etc. may also be construed in the same manner.

Terms used in the present specification are merely used for explaining specific embodiments, but not intended to limit the present disclosure. Unless the context clearly dictates otherwise, singular forms include plural forms as well. It is to be understood that terms "include," "have," etc. as used herein specify the presence of stated features, integers, steps, operations, elements, components, or combination thereof, but do not preclude the presence or addition of one or more other features, integers, steps, operations, elements, components or combination thereof.

Unless defined otherwise, all terms used herein including technical or scientific terms have the same meanings as those generally understood by a person having ordinary knowledge in the art to which the present disclosure pertains. The terms such as those defined in generally used dictionaries are construed to have meanings matching that in the context of related technology, and unless clearly defined otherwise, are not construed to be ideally or excessively formal.

Below, the present disclosure will be described in detail by describing embodiments with reference to the accompanying drawings. Like reference numerals in the drawings refer to like numerals.

Figure 2:
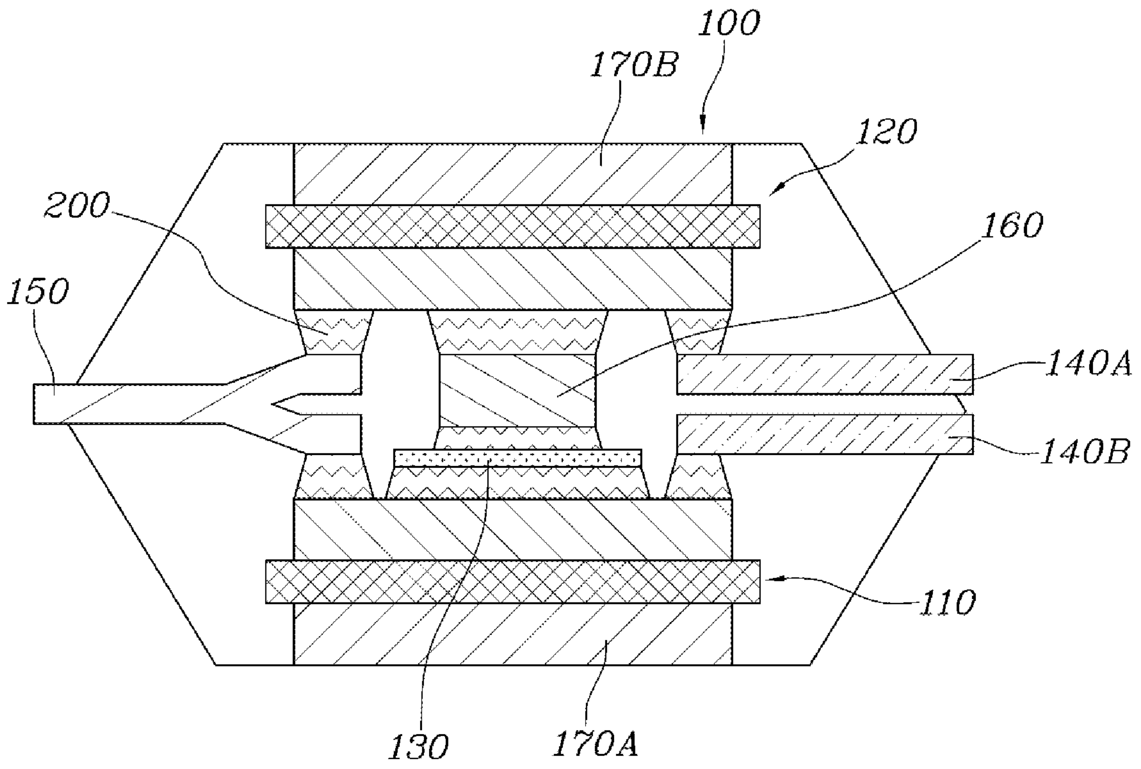
FIG. 2 is a lateral cross-sectional view of a power module for a vehicle according to another exemplary embodiment of the present disclosure.
Figure 3:
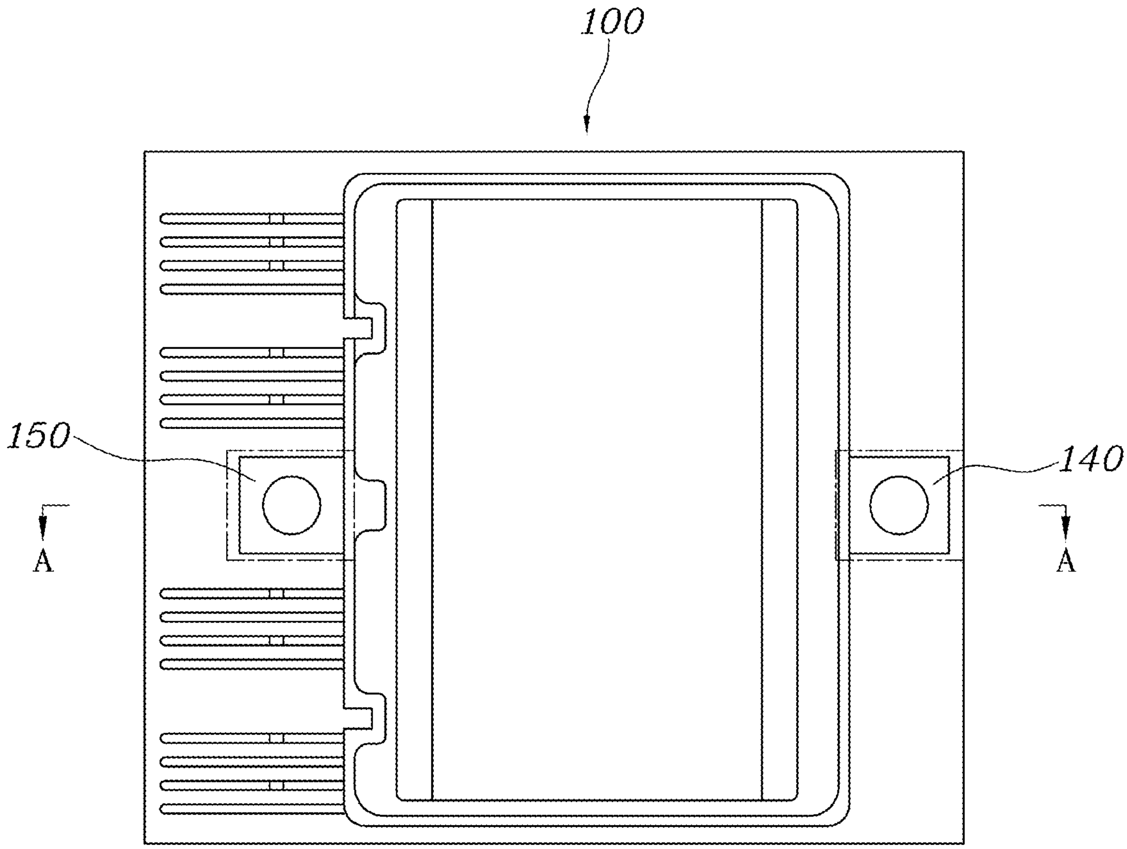
FIG. 3 is a plan view of a power module for a vehicle according to an exemplary embodiment of the present disclosure.
Figure 4:
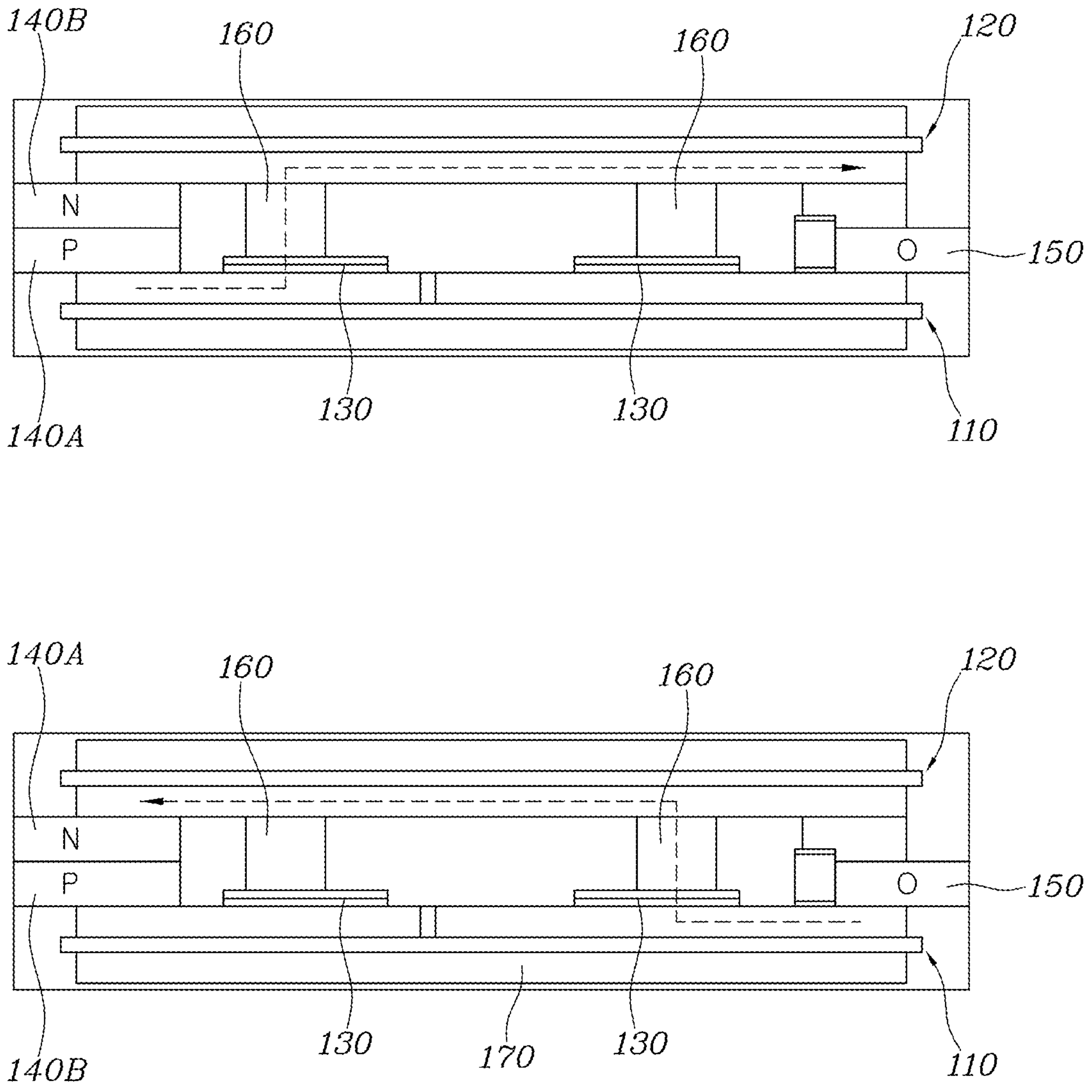
FIG. 4 is a view showing a current flow in a power module for a vehicle according to an exemplary embodiment of the present disclosure.
Figure 5:
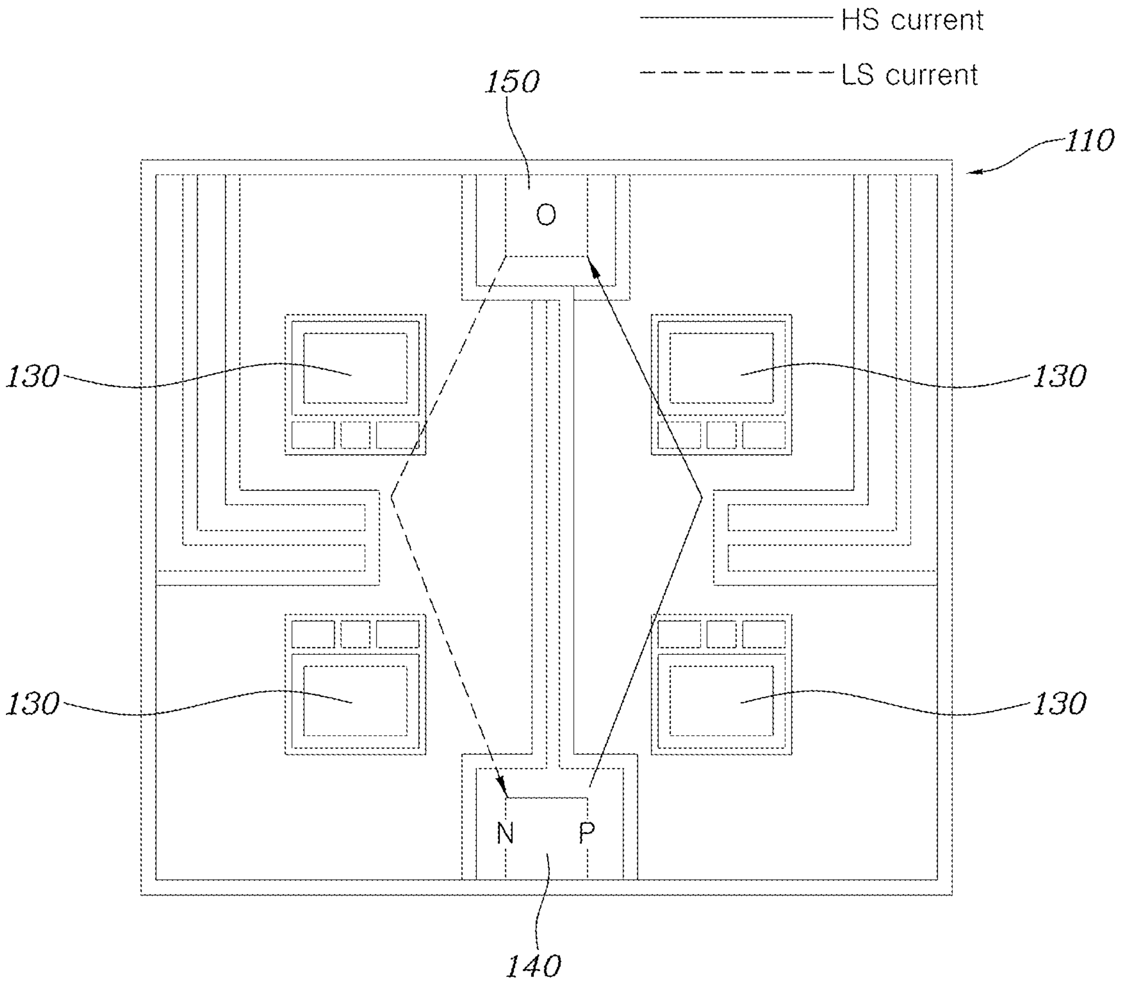
FIG. 5 is another view showing a current flow in a power module for a vehicle according to an exemplary embodiment of the present disclosure.

FIG. 1 is a lateral cross-sectional view of a power module 100 for a vehicle according to an exemplary embodiment of the present disclosure, FIG. 2 is a lateral cross-sectional view of a power module for a vehicle according to another exemplary embodiment of the present disclosure, FIG. 3 is a plan view of the power module 100 for a vehicle according to an exemplary embodiment of the present disclosure, FIG. 4 is a view showing a current flow in the power module 100 for a vehicle according to an exemplary embodiment of the present disclosure, and FIG. 5 is another view showing a current flow in the power module 100 for a vehicle according to an exemplary embodiment of the present disclosure.

A conventional power module for a vehicle includes a pair of substrates separated into an upper substrate and a lower substrate in upward and downward directions for miniaturization and improvement in cooling efficiency, a semiconductor chip connected to any one of the upper substrate and the lower substrate, and a via spacer for connecting the upper substrate and the lower substrate.

Due to the via spacer for the connection between the upper substrate and the lower substrate, the conventional power module for a vehicle requires an area for the via spacer, and this area makes it difficult to miniaturize the power module and complicates a connection route, causing problems of deteriorating electrical characteristics.

To solve the foregoing problems of the conventional power module for a vehicle, the present disclosure has been devised.

Embodiments of the power module 100 for the vehicle according to an exemplary embodiment of the present disclosure will be described with reference to FIG. 1, FIG. 2, FIG. 3, and FIG. 4.

The power module 100 for the vehicle according to an exemplary embodiment of the present disclosure includes a lower substrate 110 and an upper substrate 120; a semiconductor chip 130 disposed between the lower substrate 110 and the upper substrate 120; a first power lead 140 disposed being spaced from the semiconductor chip 130, and including a plurality of pieces respectively connected to the lower substrate 110 and the upper substrate 120; and a second power lead 150 disposed being spaced from the semiconductor chip 130 and connected to the lower substrate 110 and the upper substrate 120.

As shown in FIG. 1, the upper substrate 120 and the lower substrate 110, to which the semiconductor chip 130 is mountable, are provided to face each other, and the semiconductor chip 130 may be disposed between the upper substrate 120 and the lower substrate 110 and connected to either the upper substrate 120 or the lower substrate 110.

Furthermore, the first power lead 140 connected to the outside may be provided at one side of the upper and lower substrates 120 and 110, and the second power lead 150 connected to the outside and connected to both the upper substrate 120 and the lower substrate 110 may be provided at the other side of the upper and lower substrates 120 and 110.

With the present structure, a current flowing in the first power lead 140 flows to the second power lead 150 through the semiconductor chip 130, and a current flowing into the second power lead 150 may flow to the first power lead 140 through the semiconductor chip 130.

In the present way, the second power lead 150 can replace the via spacer provided in the conventional power module for a vehicle and connecting the upper substrate and the lower substrate. Thus, it is possible to remove the via spacer and reduce a space occupied by the via spacer, having effects on miniaturizing the power module 100 and simplifying the structure of the power module 100.

The first power lead 140 and the second power lead 150 may be disposed at opposite sides to each other with the semiconductor chip 130 therebetween on a plane.

As shown in FIG. 1, FIG. 2, and FIG. 3, the first power lead 140 connected to one side of the upper and lower substrates 120 and 110 facing each other and the second power lead 150 connected to the other side may be disposed to face each other with respect to the semiconductor chip 130.

As the first power lead 140 and the second power lead 150 are disposed at the opposite sides to each other, a current path is simplified to improve electrical characteristics. As the via spacer is removed, parasitic inductance is significantly reduced.

The first power lead 140 may include a positive electrode 140A and a negative electrode 140B, and the second power lead 150 may include an output electrode.

As shown in FIG. 1, FIG. 2, and FIG. 3, the power module 100 may include the positive electrode (P) 140A and the negative electrode (N) 140B respectively connected to the upper substrate 120 and the lower substrate 110, and therefore a current may flow into the positive electrode (P) 140A when the motor of the vehicle works. The positive electrode (P) 140A and the negative electrode (N) 140B may be disposed to face each other in a vertical direction.

As shown in FIG. 1, FIG. 2, and FIG. 3, the positive electrode (P) 140A and the negative electrode (N) 140B are provided in a vertical direction, and thus disposed as close to each other as possible.

As described above, the positive electrode (P) 140A and the negative electrode (N) 140B are connected to face each other in the upward and downward directions, and disposed as closed to each other as possible, increasing mutual inductance effects.

As shown in FIG. 1, in the power module 100 for the vehicle according to an exemplary embodiment of the present disclosure, a circuit board is separated into the upper substrate 120 and the lower substrate 110, the upper substrate 120 and the lower substrate 110 may be disposed to face each other, and the upper substrate 120 and the lower substrate 110 may include a metal layer 170 connected to a cooler and performing cooling.

The metal layer 170 may be connected to the cooler provided with a cooling channel in which a coolant flows, and dissipate heat generated in the semiconductor chip 130 connected to the circuit board based on the cooling of the cooler, allowing the power module 100 for a vehicle to normally work.

As shown in FIG. 1, the upper substrate 120 may include an upper metal layer 170B provided on the external side, and the lower substrate 110 may include a lower metal layer 170A provided on the external side.

The upper metal layer 170B connected to an upper cooler may dissipate heat radiated above the upper substrate 120, and the lower metal layer 170A connected to a lower cooler may dissipate heat radiated blow the lower substrate 110. In the present way, the power module 100 is cooled on both sides thereof, having an effect on improving cooling efficiency.

The semiconductor chip 130 is connected to one of the lower substrate 110 and the upper substrate 120, and a spacer 160 is further provided to connect the semiconductor chip 130 and the other substrate.

As shown in FIG. 1, the semiconductor chip 130 may be connected to the lower substrate 110 by a bonding material 200, and the spacer 160 for connecting the upper substrate 120 and the semiconductor chip 130 may include one side connected to the semiconductor chip 130 and the other side connected to the upper substrate 120 so that a current can flow between the upper substrate 120 and the lower substrate 110.

The upper substrate 120 and the lower substrate 110 may include metal portions 122 and 112 for connecting with the semiconductor chip 130, the first power lead 140, the second power lead 150 or the spacer 160, and insulating substrates 121 and 111 insulating the metal portions from the outside.

The upper substrate 120 and the lower substrate 110 may include the metal portions 122 and 112 formed with a circuit pattern to which the semiconductor chip 130, the first power lead 140, the second power lead 150 or the spacer 160 is electrically connected; and the insulating portions 121 and 111 for insulating the metal portions from the outside.

Furthermore, the metal layer 170 may be connected to the external side of the insulating substrate 111 and 121 and cool the upper substrate 120 and the lower substrate 110. Furthermore, the insulating substrate 111 and 121 insulates the metal layer 170 from the metal circuit and may also insulate an external material not to interfere with the metal circuit.

The current may flow in order of the first power lead 140, the semiconductor chip 130, and the second power lead 150, or in order of the second power lead 150, the semiconductor chip 130, and the first power lead 140.

As shown in FIG. 4 and FIG. 5, a current flowing into the first power lead 140 (P terminal) flows to the second power lead 150 (O terminal) via the semiconductor chip 130, and a current flowing into the second powerlead 150 (O terminal) flows to the first power lead 140 (N terminal) via the semiconductor chip 130.

In the instant case, a current path has conventionally been formed to be lengthened as the first power lead and the second power lead are disposed at a same side. On the other hand, according to an exemplary embodiment of the present disclosure, as shown in FIG. 4 and FIG. 5, the first power lead 140 and the second power lead 150 are disposed at the opposite sides to each other, and allow the current to flow via the semiconductor chip 130, shortening the current path and having an effect on reducing parasitic inductance.

As various exemplary embodiments of the second power lead 150, the thickness of the second power lead 150 may be equal to the spacing distance between the upper substrate 120 and the lower substrate 110, and thus connected to both the lower substrate 110 and the upper substrate 120 at one side thereof.

As shown in FIG. 1, the second power lead 150 may be formed as thick as the spacing distance between the upper substrate 120 and the lower substrate 110 in order to connect the upper substrate 120 and the lower substrate 110 at once.

In the present way, one side of the second power lead 150 is connected to the upper substrate 120 and the lower substrate 110 at a time, and the second power lead 150 is formed as thick as the spacing distance between the upper substrate 120 and the lower substrate 110, making it easy to connect the upper substrate 120 and the lower substrate 110.

Therefore, a current flowing into the second power lead 150 is allowed to flow to the first power lead 140 via the semiconductor chip 130, or a current flowing into the first power lead 140 is allowed to flow to the second power lead 150 via the semiconductor chip 130, shortening the current path.

As various exemplary embodiments of the second power lead 150, the second power lead 150 may bifurcate at one side thereof, and connected to the lower substrate 110 and the upper substrate 120 at once.

As shown in FIG. 2, one side of the second power lead 150 is branched into two parts and the two parts are respectively connected to the upper substrate 120 and the lower substrate 110 in order to connect the upper substrate 120 and the lower substrate 110 at once.

In the present way, one side of the second power lead 150 is connected to the upper substrate 120 and the lower substrate 110 at a time, and it is not necessary to form the second power lead 150 according to the various exemplary embodiments as thick as that of the various exemplary embodiments of the present disclosure, reducing costs as compared to that of the various exemplary embodiments of the present disclosure.

Therefore, a current flowing into the second power lead 150 is allowed to flow to the first power lead 140 via the semiconductor chip 130, or a current flowing into the first power lead 140 is allowed to flow to the second power lead 150 via the semiconductor chip 130, shortening the current path.

A high side current may flow in order of the first power lead 140, the semiconductor chip 130, and the second power lead 150, and a low side current may flow in order of the second power lead 150, the semiconductor chip 130, and the first power lead 140.

As shown in the upper drawing of FIG. 4, the high side current is input to the positive electrode 140A of the first power lead 140 and flows to an output electrode, i.e., the second power lead 150 via the semiconductor chip 130.

Furthermore, as shown in the lower drawing of FIG. 4, the low side current is input to the second power lead 150 and flows to the negative electrode 140B of the first power lead 140 via the semiconductor chip 130.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain predetermined principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A power module for a vehicle, the power module comprising: a lower substrate and an upper substrate spaced from the lower substrate; a semiconductor chip disposed between the lower substrate and the upper substrate; a first power lead disposed being spaced from the semiconductor chip and connected to one of the lower substrate and the upper substrate; and a second power lead disposed being spaced from the semiconductor chip and connected to both of the lower substrate and the upper substrate, wherein the first power lead includes a positive electrode and a negative electrode, and wherein the positive electrode and the negative electrode are disposed to face each other in a predetermined direction with a predetermined gap therebetween, the predetermined direction being a vertical direction in which the lower substrate and the upper substrate are stacked, and wherein the second power lead bifurcates at one side thereof and each bifurcated portion of the second power lead is connected to the lower substrate and the upper substrate, respectively.

2. The power module of claim 1, wherein the first power lead and the second power lead are disposed at opposite sides to each other with the semiconductor chip between the first power lead and the second power lead on a plane.

3. The power module of claim 1, wherein the second power lead includes an output electrode.

4. The power module of claim 3, wherein the positive electrode is connected to the one of the upper substrate and the lower substrate, and the negative electrode is connected to a remaining one of the upper substrate and the lower substrate.

5. The power module of claim 4, wherein the positive electrode is connected to a metal portion in the one of the upper substrate and the lower substrate, and the negative electrode is connected to a metal portion in the remaining one of the upper substrate and the lower substrate.

6. The power module of claim 1, wherein a current flows in order of the first power lead, the semiconductor chip, and the second power lead, or in order of the second power lead, the semiconductor chip, and the first power lead.

7. The power module of claim 6, wherein a high side current flows in the order of the first power lead, the semiconductor chip, and the second power lead.

8. The power module of claim 6, wherein a low side current flows in the order of the second power lead, the semiconductor chip, and the first power lead.

9. The power module of claim 1, wherein the second power lead includes a first surface connected to the upper substrate, and a second surface opposite to the first surface and connected to the lower substrate.

10. The power module of claim 1, wherein the positive electrode and the negative electrode are disposed to directly face each other in the predetermined direction with the predetermined gap therebetween.

* * * * *